United States Patent [19]

Evans

[11] 4,254,677
[45] Mar. 10, 1981

[54] SLITTER BLADE POSITIONING MEANS

[75] Inventor: Donald J. Evans, Cherry Hill, N.J.

[73] Assignee: Molins Machine Company, Inc., Cherry Hill, N.J.

[21] Appl. No.: 91,644

[22] Filed: Nov. 5, 1979

[51] Int. Cl.³ .............................................. B23D 19/06
[52] U.S. Cl. ......................................... 83/13; 83/482; 83/499; 83/504
[58] Field of Search ................... 83/13, 482, 499, 501, 83/502, 504, 425.4; 93/58.2 R

[56] References Cited

U.S. PATENT DOCUMENTS

| | | | |
|---|---|---|---|
| 1,134,590 | 4/1915 | Cowan | 83/482 |
| 1,892,680 | 1/1933 | Petersen | 83/504 |
| 4,010,677 | 3/1977 | Hirakawa et al. | 83/499 X |
| 4,162,643 | 7/1979 | Coburn | 83/499 |

Primary Examiner—Frank T. Yost
Attorney, Agent, or Firm—Seidel, Gonda, Goldhammer & Panitch

[57] ABSTRACT

A slitter mechanism for slitting elongated webs of material into narrower webs by operative blades on parallel shafts. Inoperative blades are provided in an idle zone on said shafts. The blades in the idle zone are movable out of contact with each other without interfering with the mating relationship of the operative blades.

5 Claims, 2 Drawing Figures

SLITTER BLADE POSITIONING MEANS

BACKGROUND

Slitters of the type involved herein are known to those skilled in the art. For prior art relating to slitters having operative sets of blades as well as inoperative blades in an idle zone on the same shafts, see U.S. Pat. No. 4,010,677. For prior art with respect to the concept of having an expandable shaft which facilitates simultaneous locking of all blade heads to the shaft, see U.S. Pat. No. 4,162,643. The last mentioned patent also discloses the concept of a master shifter for simultaneously shifting mating blades on a set of parallel shafts.

The present invention is directed to a solution of a problem which exists in each of said patents. When all blades on parallel shafts are simultaneously locked and unlocked with respect to the shafts, it is conventional to have some of the blades operative and others which are inoperative. It is desirable to have a simple arrangement for moving the sets of inoperative blades apart so that they do not rub against each other while permitting the operative blades to be in mating contact for performing their intended function. If the inoperative sets of blades are in rubbing contact with one another, they create a drag force which must be overcome and the blades wear out faster. The present invention is directed to a solution of this problem.

SUMMARY OF THE INVENTION

The present invention is directed to apparatus for slitting a moving web into a plurality of narrower webs. The apparatus includes parallel shafts having a plurality of sets of mating heads thereon. Some of the heads are operative while others are idle. Each head supports a blade and has a pushing surface thereon. The distance between each pushing surface and the edge of the blade associated with it is uniform on all of said heads except for the outermost head on one of said shafts. When the pushing surface on said outermost head is aligned with the pushing surface on its mating head the blades on all of said idle heads will be out of contact.

It is an object of the present invention to provide a simple and reliable means for separating the blades on idle heads while other blades on the same shafts are operative.

It is an object of the present invention to provide a slitter wherein some blades are operative and some blades are idle with means for separating the idle blades without interfering with the operative blades.

Other objects will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
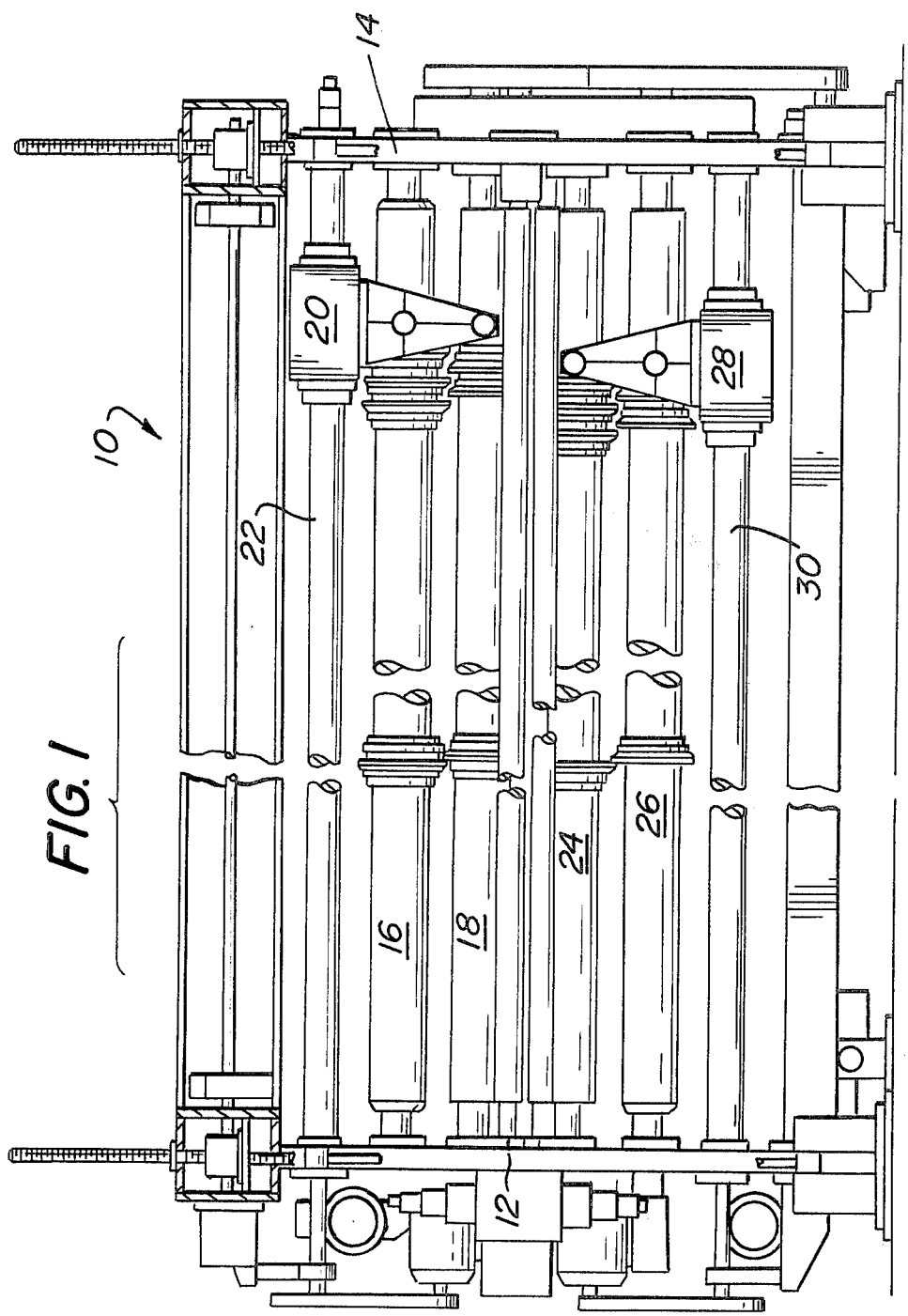
FIG. 1 is a sectional view through a slitter in accordance with the present invention.

Referring to the drawing in detail, wherein like numerals indicate like elements, there is shown in FIG. 1 a slitter designated generally as 10. The slitter 10 is preferably of the type having an upper path and a lower path. The sectional view shown in FIG. 1 is analogous to that shown in FIG. 4 of U.S. Pat. No. 4,010,677.

The apparatus 10 includes side frames 12 and 14 which support an upper set of shafts 16, 18 and a lower set of shafts 24, 26. A master shifter 20 is provided for shifting mating sets of blades on shafts 16, 18. A master shifter 28 is provided for shifting mating sets of blades on shafts 24, 26. Shifter 20 is guided by shaft 22 and shifter 28 is guided by shaft 30. The master shifters 20, 28 may be of the type disclosed in FIG. 4 of U.S. Pat. No. 4,162,643.

Figure 2:
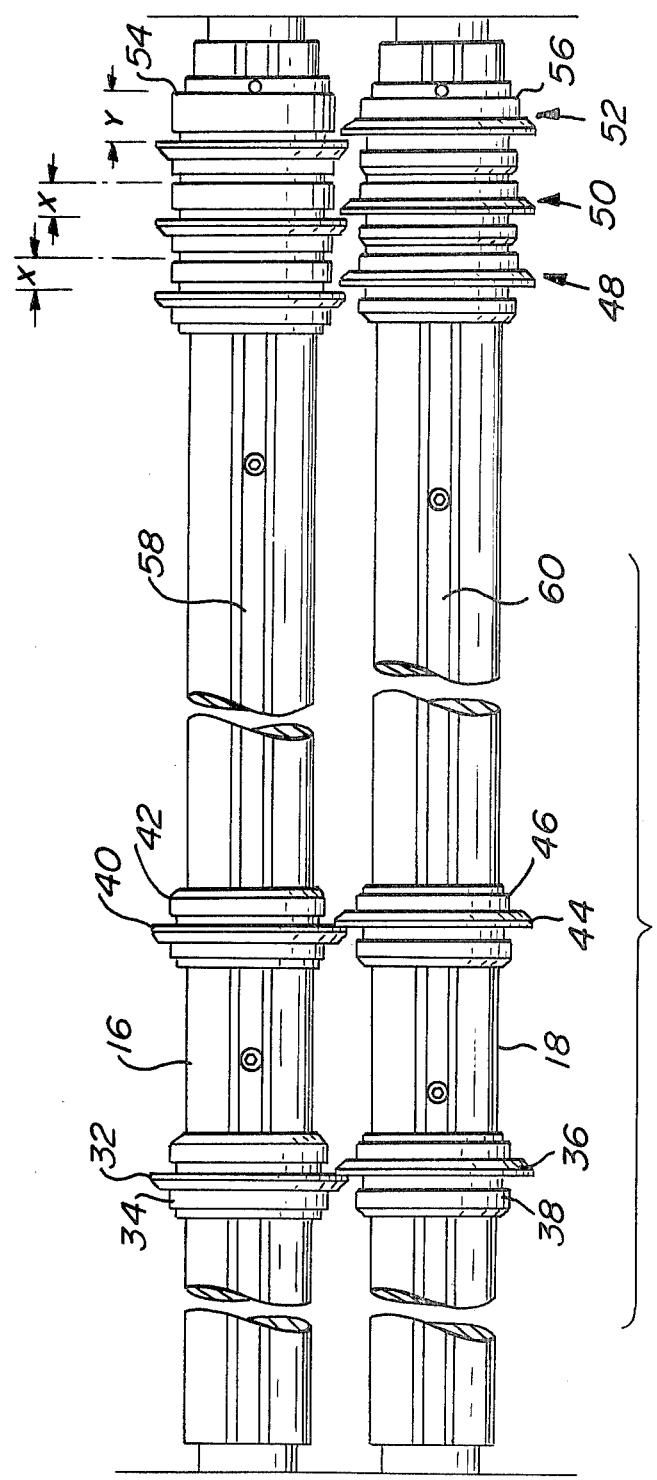
FIG. 2 is an enlarged detailed view of the upper set of shafts in FIG. 1 with elements not shown for purposes of clarity of illustration.

Referring to FIG. 2, there is shown mating heads 34, 38 on the shafts 16, 18 respectively. Head 34 supports a blade 32 which mates with blade 36 on head 38. Shaft 16 also supports a head 42 which mates with head 46. Head 42 has a blade 40 which mates with a blade 44 on head 46.

The thusly described sets of mating heads and blades may be referred to as the operative heads of the shafts 16 and 18. Thus, shafts 16 and 18 are sufficiently long so as to have an operative zone corresponding in length to the widest web capable of being slit by the apparatus 10 as well as an idle or park zone indicated at the right hand side of FIG. 2. In the idle or park zone, there are mating sets of heads and blades designated 48, 50, and 52. A greater or lesser number of idle sets of mating heads and blades may exist during any particular production run.

Each of the heads has a radially disposed side face which constitutes a pushing surface so that mating sets of heads may be pushed along their respective shafts in the manner described in U.S. Pat. No. 4,162,643. Thus, in the preferred embodiment each head has a pushing surface on opposite ends thereof so that the heads may be pushed in opposite directions. Preferably all of the heads are of the same size except for the outermost head on one of the shafts which is wider than the others. Alternatively, all the heads may be of the same width with the distance between a pushing surface and a blade side face on the outermost head on one of the shafts larger than a corresponding distance on all of the other heads. In either alternative, there results an unbalanced situation wherein the distance between the pushing surface and the blade side face associated therewith on one of the outermost heads is different from that on its mating head. When the pushing surfaces on the outermost heads are aligned with each other, the blades on all of the heads in the idle position will be out of contact with one another as shown at the righthand end of FIG. 2.

As shown more clearly at the right hand end of FIG. 2, the outermost head on shaft 16 has a pushing surface 54 spaced from a side face of its associated blade by a distance designated Y. The corresponding distance designated as X on each of the remaining heads on each of the shafts 16 and 18 is smaller than distance Y. When pushing surface 54 aligns with pushing surface 56 on its mating head as illustrated in FIG. 2, the blades on each of the heads of sets 48, 50 and 52 are spaced from one another so as to be out of contact. Movement of pushing surface 54 so as to be aligned with pushing surface 56 is attained by the master shifter 20. Corresponding structure is provided for the lower web path associated with shafts 24 and 26. If the mating sets of blades are spring biased toward each other, the differential between distances X and Y is sufficient so as to be certain that the distance exceeds the movement of the blades when compressing the spring associated therewith. Adjustment of the heads of sets 48, 50 and 52 to separate the blades associated therewith has no effect on the mating relationship of the blades 32, 36 and 40, 44. Shaft 16 has a friction drag surface 58 and shaft 18 has a friction drag surface 60. The drag surfaces are preferably of the type disclosed in U.S. Pat. No. 4,162,643. The friction drag surfaces 58, 60 prevent the mating sets of blades in the operative portion of the shafts from separating when the master shifters engage surface 54 and 56 to cause them to be aligned in the idle zone.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for slitting a moving web into a plurality of narrower webs comprising a pair of parallel shafts supporting a plurality of sets of mating heads supporting a slitting blade some of which are operative and some of which are idle, each head having a pushing surface theron, the distance between each pushing surface and the blade associated therewith being uniform on each of said heads except for the outermost head on one of said shafts so that when the pushing surfaces of said outermost heads are aligned the blades of said idle heads are out of contact.

2. Apparatus in accordance with claim 1 wherein the distance between the pushing surface and a side face of the blade on said one idle head is wider than the corresponding distance of its mating head.

3. Apparatus in accordance with claim 2 wherein each shaft has a friction drag surface in contact with the inner periphery of each head thereon.

4. Apparatus in accordance with claim 2 including a master shifter associated with said shafts for simultaneously moving mating heads on said shafts in an axial direction.

5. A method of separating the cutting edges of pairs of idle disk-shaped slitter blades mounted on heads supported by a pair of parallel shafts in a web slitting machine having a zone for parking idle heads while other pairs of heads have blades slitting a moving web into narrower webs in an operative zone, head pairs being movable in an axial direction by a master head shifter comprising the steps of providing all heads with a uniform distance between a side face of a blade and a pushing surface on the associated head except for the outermost head on one of said shafts, traversing the master shifter to a position outward of the idle head pairs, moving the idle head pairs by said master shifter in an axial direction toward the operative pairs of heads until the pushing surface on said one head is aligned with the pushing surface on its mating head to thereby separate the mating blades on the idle head pairs.

* * * * *